FIG. 2

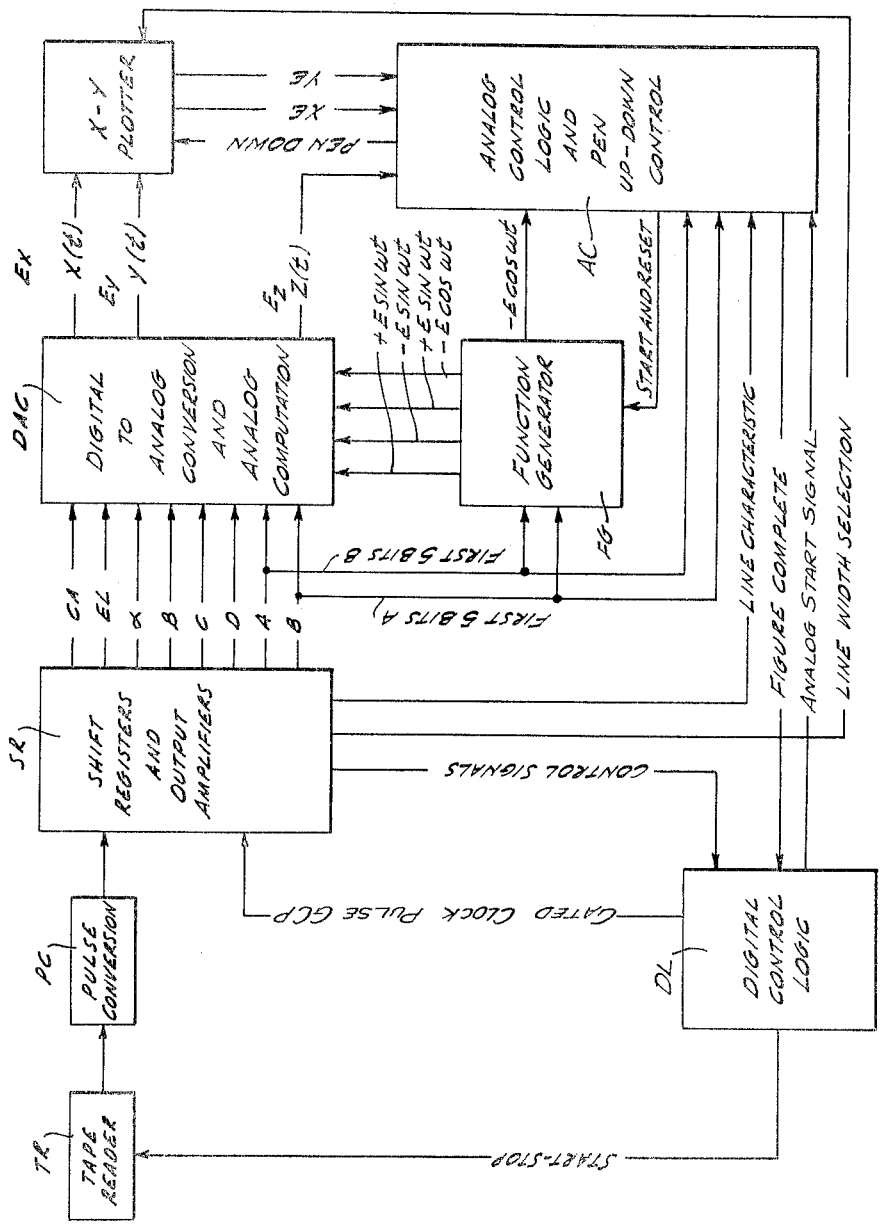

| | | DA | | LA | | D | | C | | B | | A | | B | | α | | |
|---|---|---|---|---|---|---|---|---|---|---|---|---|---|---|---|---|---|---|
| LATERAL PARITY CHANNEL | | | | | | | | | | | | | | | | | | CH 7 |
| TK | SP | 3 | 0 | 5 | 10 | 14 | 9 | 4 | 14 | 9 | 4 | 14 | 9 | 4 | 14 | 9 | 4 | CH 6 |
| TN | B>A | 4 | 1 | 6 | 11 | 13 | 8 | 3 | 13 | 8 | 3 | 13 | 8 | 3 | 13 | 8 | 3 | CH 5 |
| CLOCK PULSE CHANNEL | | | | | | | | | | | | | | | | | | CH 4 |
| PH | 0 | 5 | 2 | 7 | 12 | 12 | 7 | 2 | 12 | 7 | 2 | 12 | 7 | 2 | 12 | 7 | 2 | CH 3 |
| HI | 1 | 6 | 3 | 8 | 13 | 11 | 6 | 1 | 11 | 6 | 1 | 11 | 6 | 1 | 11 | 6 | 1 | CH 2 |
| CE | 2 | 7 | 4 | 9 | 14 | 10 | 5 | SN | 10 | 5 | SN | 10 | 5 | SN | 10 | 5 | EL | 10 | 5 | CA | CH 1 |

DA — DRAWING ADDRESS
LA — LINE ADDRESS
CE — CENTERLINE
CA — CIRCULAR ARC
SN — SIGN
TK — THICK PEN
TN — THIN PEN
PH — PHANTOM LINE
HI — HIDDEN LINE
EL — ELLIPSE
SP — SLOW PEN

NUMERICAL DESIGNATION IN PROGRAM EQUALS X IN $2^{-X}$ AND EQUALS RATIO OF FULL SCALE VALUE.

CLOCK PULSE BITS ARE ALL ONES.

PARITY — EVEN, LONGITUDINAL
— ODD — LATERAL.

Jan. 4, 1966  R. K. KADOGUCHI  3,227,864
MACHINE CONTROL SYSTEM
Filed Dec. 29, 1961  5 Sheets-Sheet 3

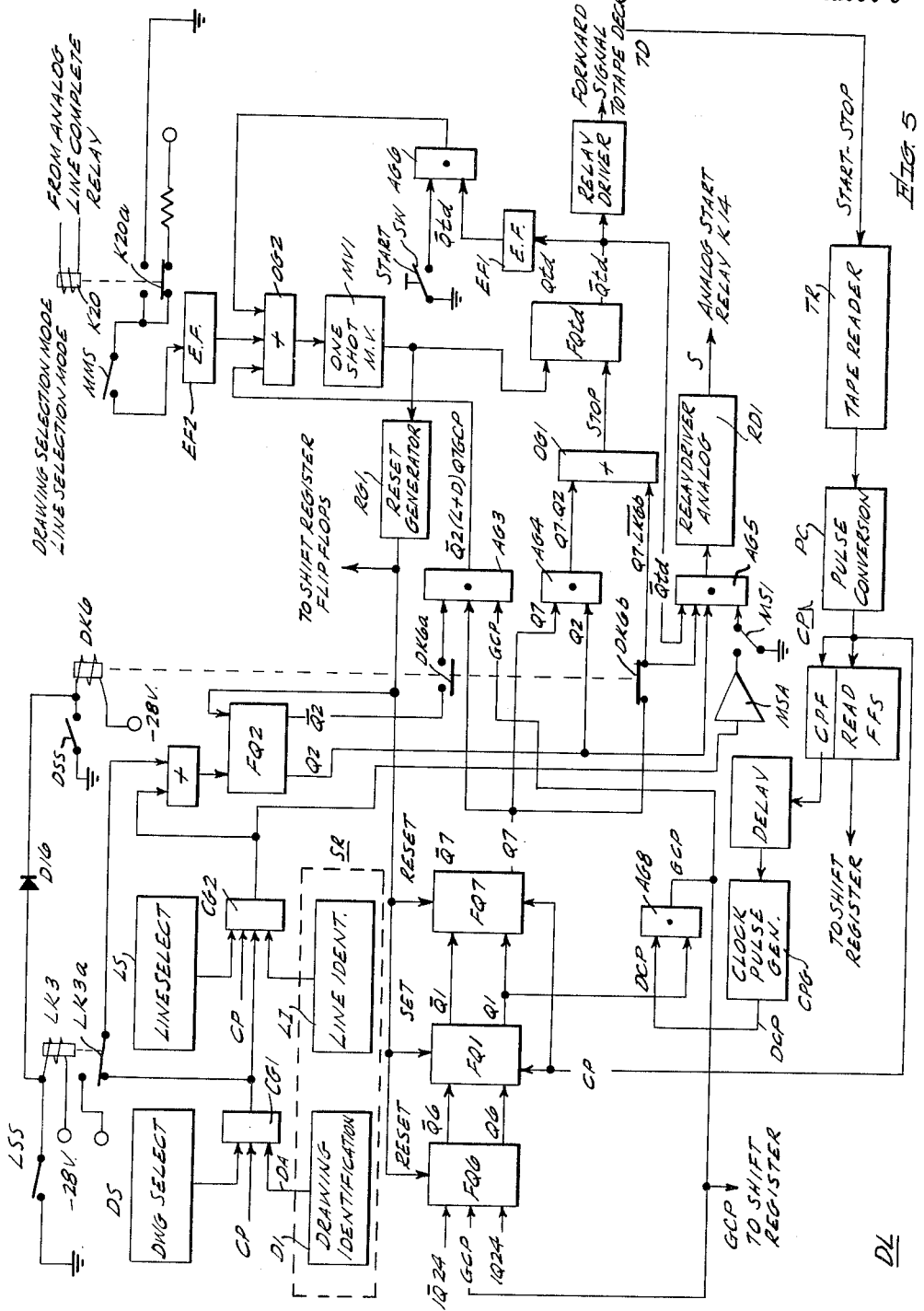

United States Patent Office 3,227,864
Patented Jan. 4, 1966

3,227,864
MACHINE CONTROL SYSTEM
Ronald K. Kadoguchi, Los Angeles, Calif., assignor to Hughes Aircraft Company, Culver City, Calif., a corporation of Delaware
Filed Dec. 29, 1961, Ser. No. 163,156
7 Claims. (Cl. 235—151.11)

This invention relates generally to systems of electrical control, and more particularly to an arrangement responding to digital information to control an electrical system.

While the descriptive disclosure hereinafter is particularly directed to a system for moving a pen or other line drawing implement according to a specified program for the purpose of making drawings, writing, printing and the like, it will be appreciated that this invention is not particularly limited to such a specific function or to such a particular type of output device but may be used to power any suitable device in the layout or manufacture of printed circuits in machining operations, etc.

Additionally, this invention, and consequently the descriptive disclosure, is directed to those aspects of the overall system permitting the selection of drawings to be reproduced, permitting the selection of lines of particular drawings at which changes are to be made and, in general, providing for the automatic reproduction of complete drawings, partial drawings, a single line of a selected drawing, etc., and to this end does not cover all of the details of the complete system. If additional details concerning the complete system are desired, reference may be had to a copending application of P. Brock, et al., Serial No. 163,263, filed on the same date as this application, entitled Electrical System, and assigned to the assignee of this invention.

Efforts have been made by others to automatize drafting, that is, to automatize the making of line drawings. These prior art systems have been developed to the point where the specific drawing is completely encoded on a digital record member as a digital program. These systems are usually based upon a system of mathematics, defining straight lines in point-slope form. The digital program is transduced in a specific sequence and converted to analog form to power a suitable type of analog servo system having a pair of servo motors which power and move a single output member in each of two mutually perpendicular directions.

One requirement of an automatic drawing machine is to selectively receive digital information on a moving storage medium and to reliably control the machine operation in response to that digital information.

An object of this invention is to provide a digital control system for selecting information on a tape reader.

It is another object of this invention to provide, in a drafting machine, a system for drawing lines to a selected line number of a drawing and then stopping the drawing of lines to provide a drawing modification mode of operation.

It is a further object of this invention to provide a control circuit for a drafting machine that provides selection of serially arranged information on a storage medium representing a desired line and drawing number and then draws lines automatically.

It is a still further object of this invention to provide a control system for a drafting machine that in one mode selects a line to be drawn and in another mode draws lines and stops at a selected line to provide drawing modifications.

The aforesaid and other objects and advantages are achieved in an arrangement according to this invention which generates and employs time variable electrical quantities characterized by selected time parametric functions for controlling a servo system to selectively describe straight lines, circular arcs, or circles, and elliptical arcs, or ellipses, of specific dimension or sizes and at particularly defined points in a given reference plane, such as a drawing board.

The program of the servo system is digitally encoded on a suitable record medium, such as paper tape, magnetic tape or other record bearing medium, as a discrete information code system in conventional binary code, for instance, together with other discrete information recordings having place or position significance on the medium for directing control of specific control elements in the system. Suitable transducers read this medium or tape and the signals thus generated after suitable conversion, amplification and shaping, if needed, are stored in a digital storage circuit such as a shift register which may include a plurality of flip flops conventionally set in correspondence with the respective discrete signals. The digitally encoded information includes the following:

(1) Dimensions in both coordinates from a reference point in the reference plane to the geometric center of the figure which is to be drawn.

(2) Dimensions and their signs defining the starting point of any line describing a geometric figure in terms of the respective coordinates of that point referred to the geometric center of the figure.

(3) Dimensions and their signs defining the stopping point of any line.

(4) Respective commands denoting if a circular arc or an ellipse is to be drawn.

(5) Respective commands denoting which of several line thicknesses is to be used.

(6) Respective commands denoting if any of several line interruption patterns (line characteristics) is to be used.

(7) Respective commands denoting drawing numbers and line numbers, if needed.

The system includes a variable frequency electrical function generator for generating sine and cosine electrical quantities of a fixed magnitude which are relatively positive or negative depending upon the algebraic signs of the coordinates defining the starting point of the line describing the geometric figure in relation to the geometric center of the figure and which vary in frequency as a function of a selected algebraic combination of at least a portion of the information defining these coordinates to provide time varying output voltages having a frequency roughly inversely proportional to the desired length of a line.

The time varying voltages thus generated are attenuated, or amplitude modulated, or multiplied by another voltage, or otherwise suitably modified, in selected pairs as a function of the coordinates of the starting point of the line defining the figure to provide simultaneous time varying X and Y line generating voltages, the corresponding instantaneous magnitudes of which jointly define respective points on the line describing the figure.

Respective position servos, termed the X and Y servos herein, are connected to and power a single output element such as a pen, for instance. The time varying voltages are applied to respective summing amplifiers the outputs of which are used to control the respective servos. These servos may include electrical motors or other suitable motors means forming part of a position servo loop of sufficient stiffness and commensurate damping to provide continuous regulation for zero voltage and, hence, position error, in following the respective time varying voltages. Such a servo arrangement may typically include a feedback potentiometer driven by a servo motor and energized by a constant or fixed voltage. The voltage tapped from this potentiometer is conventionally subtractively combined with the input voltage to the servo providing an arrangement tending to regulate for zero position error. Such a potentiometer has a length in an electrical sense at least equal to the actual maximum length of the line which may be drawn.

In operation provision is made for slewing the pen to the starting point of the line describing a selected figure. At this time the function generator is "caged" and does not produce time varying voltages. It does, however, produce positive and negative values of a fixed reference voltage which are suitably attenuated and used in the pen slewing operation. During slewing the servos are uncontrolled as to relative speeds and the pen is in elevated position. With the occurrence of a minimum threshold error in the larger of the two error quantities at the servo motor inputs, and after a time delay sufficient to allow the servo motors to settle, a signal is generated which starts the function generator and which drops the pen. The pen is now precisely positioned in line drawing position at the starting point of the line and now produces a line describing the figure which is desired, the servos now being controlled by the time varying line generating voltages. The function generator "free runs" and must be told when to stop.

Since the servos follow the respective time varying voltages, separate provision must be made to stop a line defining a geometric figure at a particular point. This is accomplished by using the function generator outputs to generate a separate time varying line-terminating voltage of sinusoidal character, for instance, which goes through zero from a positive value to a negative value, or vice versa, depending upon system requirements, in all instances, at the precise point in time on the respective time varying line generating voltages at which the line is to be interrupted. At line termination provision is made to switch the summing amplifiers for the respective servos to their memory modes so that the instantaneous magnitudes of the respective time varying line generating voltages at line termination are maintained. The servos thus have a memory of the position of the point of termination of the line. The line terminating voltage is also compensated by a voltage which varies approximately with line length to introduce a variable anticipation of line termination in proportion to pen speed to compensate the fixed electrical and mechanical delays in lifting the pen.

At this point a signal is produced indicating that the figure has been completely drawn. This signal is utilized to reset the digital storage circuits and the function generator and to initiate reading and storing an additional section of the digitally encoded input information for the purpose of drawing the next figure forming another section of the drawing.

A digital logic circuit provides facilities for selecting drawings from a tape containing instructions for pluralities of drawings on the basis of drawing numbers for each drawing, and further provides for the selection of a line, based on a line number, for each line of a drawing. The control provides for reproducing an entire drawing, reproducing a drawing to a selected line, or reproducing only a selected line.

FIG. 1 is a block diagram of an improved electrical system of control for controlling the movement and/or position of an element and which embodies the principles of this invention.

FIG. 2 illustrates a typical tape format employable in programming the present system;

Figure 3:
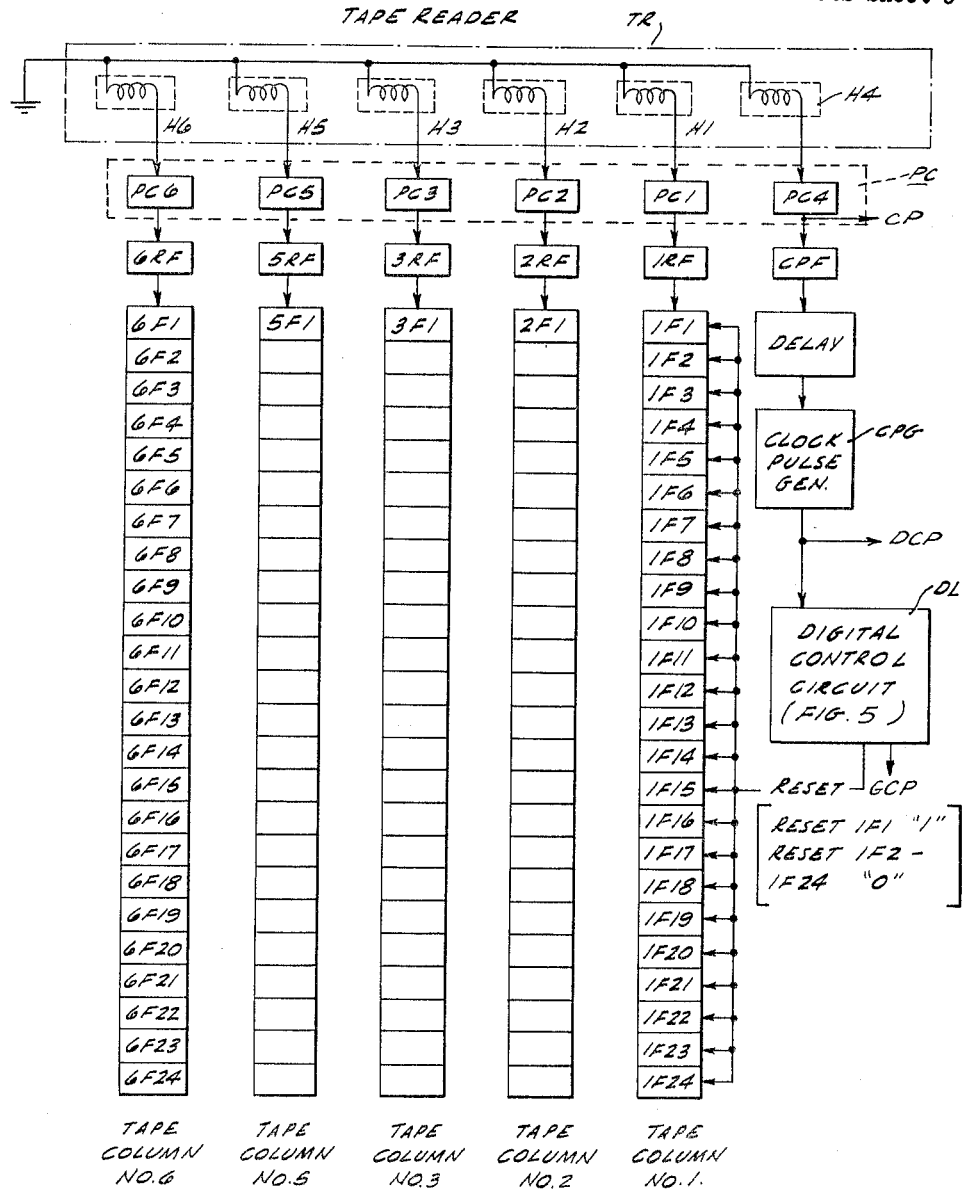
Figure 4:
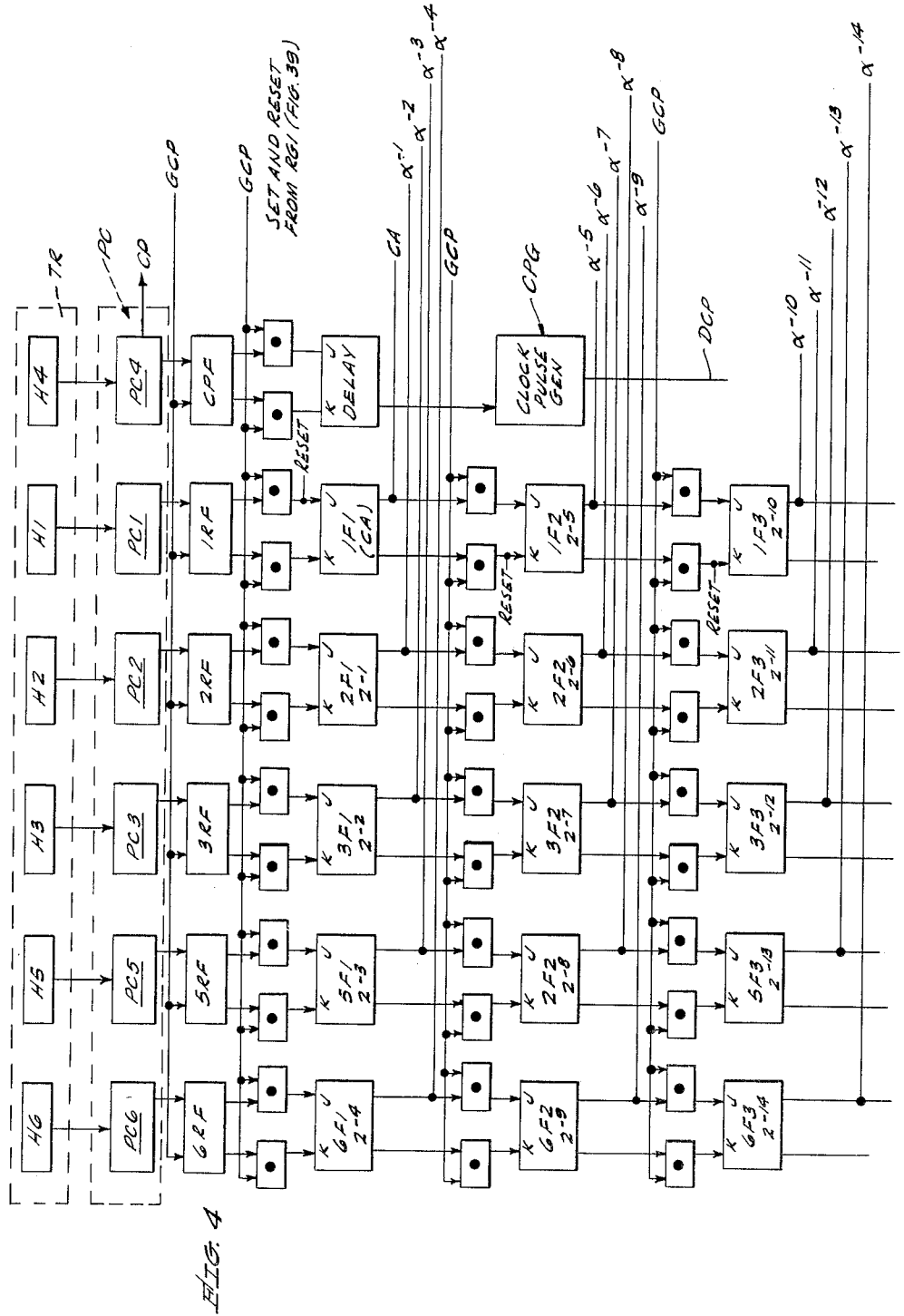

FIG. 3 schematically illustrates the organizational relationship of the tape reader and shift register of this invention;

FIG. 4 illustrates certain features of a portion of the shift register of FIG. 3 in greater detail;

FIG. 5 diagrammatically illustrates certain features of the digital controls employed herein.

The system is generally depicted in the block diagram of FIG. 1 which incorporates facilities for computing the various mathematical relationships indicated in an electrical system of control wherein suitable time varying periodic output voltages are provided to move and position an output member to describe a geometric figure of the type defined by a particularly selected time varying voltage.

The arrangement includes a conventional magnetic tape reader which is generally designated TR and which includes a magnetic tape on which the input information to the system is suitably encoded. This will be described at a later point. The output of the tape reader is applied to a suitable, conventional type of pulse conversion circuit generally designated PC, the details of which are not illustrated in the interest of simplicity. This circuit converts the A.-C. magnetic head voltages to unidirectional voltage pulses suitable for driving flip-flops and applies the voltage pulses as inputs to a flip-flop type of shift register SR. The information for a particular figure which is to be drawn is contained in a complete block of information on the tape.

FIG. 2 shows the tape format. This entire block of information is read and shifted into the shift register which produces the output signals, CA, for circular arc, EL, for ellipse, $\alpha$, the distance in $X_R$, $\beta$, the distance in $Y_R$, both $\alpha$ & $\beta$ denoting distances to the geometric center of the figure which is to be drawn, the C and D functions which are utilized to provide an indication of the end of a particular line, and the A and B signals indicating the coordinates in $X_F$ and $Y_F$, respectively, from the geometric center of the figure to the starting point $P_2$ of the line describing the figure and which determine the amplitude of the time varying periodic voltages.

These output signals are selectively combined in a suitable digital to analog circuit represented by the block identified DAC, to produce respective output voltages $E_X$ and $E_Y$ which at any instant respectively indicate the coordinates $X_R$, $Y_R$ in the reference plane, of particular points on the line describing the figure.

These output voltages are applied to an X–Y plotter involving a pair of position type servo systems having respective output motors for powering the output member in mutually perpendicular coordinate directions, the output member being connected to both of the motors to be controlled thereby. The digital-to-analog converter, DAC, also produces another time varying output voltage generally designated $E_Z$ [Z(t) inverted] the time duration of which in passing through zero from a negative value to a positive value determines the length of a line. This voltage is related to and synchronized with the voltages $E_X$ and $E_Y$, through suitable functions of $\omega t$, the common parameter, $\omega$ being the frequency of operation or oscillation of a function generator FG.

The digital-to-analog converter circuit is additionally controlled by the function generator, generally designated FG, which produces time varying voltages, $+E_R \sin \omega t$, $-E_R \sin \omega t$, $+E_R \cos \omega t$ and $-E_R \cos \omega t$.

These time varying voltages are selectively combined to produce the time varying voltages $E_X$ [X(t) inverted] and $E_Y$ [Y(t) inverted] in the digital-to-analog converter. Details of this will appear hereinafter. The function generator may be described generally as a double integrator type of oscillator circuit the frequency $\omega$ of which is controlled by suitable attenuating networks. The attenuating networks in turn are controlled by selected discrete signals of the quantities A and B from the shift register whereby the frequency of the function generator is roughly inversely proportional to the length of the line to be drawn. Selected signals of the quantities A and B are additionally applied along with the signal, $-E_R \cos \omega t$, to an analog control circuit AC which produces an output signal for controlling the pen on the X–Y plotter. This pen is typically movable between retracted and pen down, or drawing, positions. In the pen down position, the pen engages the surface of the drawing board so that a line may be drawn. This pen down signal is terminated by the signal $E_Z$ and/or other signals identifying line characteristics which determine the specific character of a line which is to be drawn, that is, a dash line, a center line, a phantom, or section, line, etc.

Provision is made in this system for slewing the pen in the reference plane to the starting point of a line describing the geometric figure which is to be drawn. Under this circumstance the pen is to be maintained in retracted position. For this purpose X error and Y error signals, XE and YE, respectively, are derived from the motor circuits, or other circuits associated with the motor circuits of the X–Y plotter, and the larger of these two signals is used to prevent lowering or dropping of the pen into engagement with the surface of the drawing board until such time as the slewing operation has terminated and the pen has satisfactorily settled in drawing position at the starting point of the line which will describe the figure to be drawn.

A digital logic control circuit DL receives control signals from the shift register circuits. These signals indicate that the tape reader TR may be started, or that the tape has been read and the information is stored in the flip flops and that the tape is to be stopped. Drawing identification and line identification signals DA and LA, respectively, also form a part of the control signals.

A pen instruction which determines the width of a line which is to be drawn is also included. In connection with this latter instruction, a plotting board, such as is herein provided, may include more than one drawing pen, in which case a line width instruction, or pen instruction, may identify a particular one of several different pens. Since these pens are not conveniently situated at precisely the same point provision is made (not shown) in such an arrangement for a parallax correction.

The analog control circuit AC produces an output signal at the completion of a particular figure. This is indicated as "Figure Complete" and actually denotes the end of a line. This output signal is applied to the digital control logic and is used to reset the system.

The full complement of signals which is to be generated by the digital portion of the system includes, in addition to those indicated in FIG. 1, the signals AS$n$, BS$n$, CS$n$ and DS$n$. This group of signals denotes, respectively, the signs positive or negative of the A, B, C and D signals.

This information, as illustrated in the tape format, FIG. 2, is encoded on a tape which may include seven different columns. One practical embodiment of this invention employs a magnetic tape and magnetic tape reader. This invention is described in accordance with such an arrangement. The tape is divided into longitudinal sections respectively designated $\alpha$, $\beta$, A, B, C, D, LA and DA. The characters LA and DA designate line address and drawing address, respectively. Each of the signals $\alpha$ through D are identified by 14 bits of information, which are weighted according to the convention, $2^{-1}$ through $2^{-14}$, for each of the 14 bits. The numerical designations in the squares of the tape format, equal X in the expression $2^{-X}$ which denotes the ratio of full scale value.

Inasmuch as $\alpha$ and $\beta$ are dimensions in the coordinates $X_R$ and $Y_R$, respectively, of the reference plane, in which $X_R=0$ and $Y_R=0$ is in the lower left corner, the signs of $\alpha$ and $\beta$ are always positive; hence, a sign indicating signal is not needed for these quantities. Each section of information $\alpha$, $\beta$, etc., involves five columns of information extending through three rows providing positions for 15 bits of information. The 15th or $2^0$ bit of information in the $\alpha$ information section of the tape is used to designate a circular arc, identified CA in the tape format. This has place significance on the tape and is connected with a particular channel of the shift register to be stepped to a particular flip flop. Similarly, in the $\beta$ information section the space EL designates the ellipse. The presence of a magnetic spot here indicates that an ellipse is to be drawn. In the information sections for the quantities A, B, C and D, the extra space for recording of information is used to designate the sign of the respective quantities. The absence of a magnetic spot in any one of the spaces designated SN indicates the number is positive. The presence of a magnetic spot indicates the quantity is negative.

The line address section LA may be organized in any convenient manner. Fifteen information recording spaces are available for recording data as to a particularly selected line. Each line of a specific drawing has a particular number. Hence, any line of a drawing may be selected by the line identification code. The section DA, set aside for the drawing address includes 10 spaces for recording of information, one of which is designated B>A and is used in one embodiment of this invention to control the application of selected discrete signals of the quantities A or B, whichever represents the quantity of greater magnitude, to the function generator attenuator networks for the purpose of controlling the frequency, $\omega$ of the output. A slow pen represented by the character SP also may be programmed here. When more than one drawing is recorded on a tape, the drawing code identifies each drawing.

The last recorded row of information includes the space marked TK and TN denoting thick pen and thin pen, respectively, PH for phantom line, HI for hidden line, and CE for center line.

The tape is read from left to right as viewed in FIG. 2 so that the last row of information which is read and which is stepped into the shift register will be that row of information including the designation CA for circular arc. The system is synchronized by means of a clock pulse train which is generated from a clock pulse column of the tape. This is designated as column 4 but may be any column thereon. The tape sprocket is conveniently used for this purpose in many instances.

Additionally, provision may be made for parity checking. Lateral parity checks may be made in a column of the tape here designated column 7 and may be odd or even as desired. Similar considerations apply also to longitudinal parity which may be even or odd as desired. Such features are not covered herein.

Any conventional type of shift register may be employed. One suitable type is schematically represented in FIG. 3.

Such a shift register may include 5 flip flop channels, each comprising 24 flip flops in correspondence with the number of information rows on the tape. These flip flops are designated 1F1 through 1R24, 2F1 through 2F24, 3F1 through 3F24, 5F1 through 5F24 and 6F1 through 6F24. The first digit of each of these designations corresponds to the column of the tape with which it is associated. The tape reader is schematically represented at the top of this figure and comprises a plurality of tape reading heads H1, H2, H3, H5 and H6 for each of the information columns and a head H4 for the clock pulse column of the tape. The outputs of these heads may be applied through suitable pulse shaping circuits PC1, PC2, PC3, PC5 and PC6 to respective asynchronous flip flops which are controlled as to frequency by the rate at which the tape is operated and which are rapidly reset in the interval between each tape information row by a suitable gated delayed clock pulse GCP as indicated, whence, subsequent to the setting of one of these flip flops by reading of information from the tape, the subsequent clock pulse application resets the flip flop to restore it for the next information row on the tape.

These asynchronous flip flops are called read flip flops and are identified 1RF, 2RF, 3RF, 5RF and 6RF. Their respective outputs are applied to the inputs of correspondingly numbered flip flops of the shift register channels. The output of the clock pulse read head H4 is similarly coupled to a pulse converter or pulse shaping circuit PC4 producing a clock pulse CP. Clock pulse CP is coupled an an asynchronous clock pulse driven flip flop CPF which develops a clock pulse synchronized voltage state signal for system timing. This signal is coupled to a suitable delay circuit which may include a one shot multivibrator which drives a clock pulse generator CPG producing a delayed clock pulse DCP. This delay is to insure the proper setting of the read flip flops which may be delayed (relative to the clock pulse signal) due to skewing of the tape during reading. The clock pulse generator output is also applied to an "and" gate, (see FIG. 5) the other input of which is controlled by a shift control flip flop, FQ1, which produces the gated clock pulse signal, GCP, applied to the flip flops of the shift register, SR, to switch these flip flops in suitable time phase synchronism with the incoming information to shift the information through the respective flip flops of the respective channels until the tape is completely read and the shift register is full of the information from the tape.

The type of shift register circuit which may be employed is depicted, in part, in greater detail in FIG. 4 which shows the first few flip flops in each of the 5 columns. These are standard flip flop circuits having two input and two output circuits. The outputs of the read flip flops are applied to the respective inputs of each of the flip flops 1F1, 2F1, 3F1, 5F1 and 6F1 to switch these flip flops in synchronism with switching of the outputs of the asynchronous flip flops. The corresponding outputs and inputs of the successive flip flops are coupled together through "and" gates which gate clock pulses GCP whenever the flip flop signals thereon are at gating voltage level, to form five shift register channels. There is a finite delay in the switching time of each flip flop. Reading of the tape is synchronized with the flip flop switching period by the gated clock pulses GCP so that information is read from the tape and stepped in sequence through the shift register. Thus, the magnetic heads H1, H2, H3, H5 and H6 drive the respective read flip flops which in turn, through the pulse conversion circuits, drive the respective flip flops of the first row of the shift register. Thereafter the information in the first row of flip flops is stepped to the second row of flip flops with the occurrence of the gated clock pulse signal GCP for the shift register. This sequence continues until the tape is completely read, at which time the information in the tape is stored in respective flip flops. Suitable amplifiers (not shown) associated with each of the flip flops may be employed to provide electrical outputs as required.

Before reading the tape, flip flop 1F1 is set to its 1Q1 state (its "1" representing state) and flip flops 1F2 to 1F24 are set in their "0" representing states, $1\bar{Q}2$, $1\bar{Q}3$, etc. On the 23rd clock pulse the "1" stored in flip flop 1F1 is shifted into flip flop 1F24 which changes to its "1" representing electrical state, 1Q24. As will be explained at a later point, this signal is used to generate a tape stop signal at the time the 26th clock pulse occurs, (FQ7 is switched to its "1" state), if the system is not in its line selection or drawing selection modes of operation, or, if in such modes, if a signal indicating line or drawing coincidence exists. The other shift register flip flops are not pre-set prior to reading the tape. FIG. 4 shows resetting signals applied to the K input terminals for setting these other flip flops in their "0" or $\bar{Q}$ electrical states.

As will be seen by reference to FIGS. 3 and 4, after the tape has been completely read and all the information has been shifted into the shift register, the first row of flip flops contains the information in the row of the tape which was last read. Hence, flip flop 1F1 is set according to the information in the space on the tape marked CA and will produce a signal on its "1" representing output terminal 1Q1, for instance, when a circular arc is desired. If there had been no magnetic spot recorded in the spot CA on the tape the flip flop would have been in its zero representing state with terminal $1\bar{Q}1$ high and terminal 1Q1 would have been at the other, or, the lower one of its two voltage states. Similar considerations apply to the information stored in flip flops 2F1, 3F1, 5F1 and 6F1 producing electrical output signals $\alpha^{-1}$, $\alpha^{-2}$, $\alpha^{-3}$ and $\alpha^{-4}$. The second row of flip flops 1F2, 2F2, 3F2, 5F2 and 6F2 produces electrical signals $\alpha^{-5}$, $\alpha^{-6}$, $\alpha^{-7}$, $\alpha^{-8}$, $\alpha^{-9}$ and the third row of flip flops 1F3, 2F3, 3F3, 5F3 and 6F3 produces electrical signals, $\alpha^{-10}$ through $\alpha^{-14}$, which covers all of the digital information for the $\alpha$ information group. These are bi-level signals.

Similar considerations apply to the $\beta$, A, B, C, D, etc., sections of the register. These are not illustrated in FIG. 4 in the interest of simplicity.

As will be seen in FIG. 1, the digital control logic circuit DL produces certain control signals. This circuit is provided with a manually controlled start switch SW (FIG. 5) utilized to start the system and produces an output signal TD (start-stop) which is applied to the tape deck and used to control the tape reader. Suitable control signals generated by the shift register and certain control flip flops associated therewith and with the digital controls, are applied to the digital control logic circuit DL. The digital control logic circuit DL also receives drawing address and line address signals DA and LA from the shift register as part of the control signal group. These signals are initiated by the tape, as indicated on the tape format. The digital logic control DL, at such time as tape reading is completed and the system is prepared to draw a line as defined by the digital instructions, produces an analog start signal S which is applied to a relay K14 (not shown), the contacts of which when closed apply —28 volts to the circuit.

A type of digital logic control embodying certain suitable logical interrelationships of several control components providing a control of the system, as set forth in the opening statements hereof, is illustrated in FIG. 5. The circuit arrangement which is shown here depicts both automatic and manual modes of operation. It will be appreciated by those skilled in the art that suitable provisions may be made to provide a more elaborate control of the system.

As earlier noted herein, a single tape may include encoded information for several drawings. Under such circumstances the drawing address section DA will be specified in each block of line instructions, as illustrated in the tape format. Similarly, each block of line instructions will include a line address section LA to identify the particular line. Thus, if a particular line of a particular drawing is being searched for, the existence of correspondingly identified lines in drawings other than the one specified will not result in stopping of the tape, but, only with the occurrence of a proper drawing address and subsequently the proper line address, will the tape be stopped.

For this purpose the digital control logic circuit DL includes both drawing selection DS and line selection LS facilities. These may include, respectively, simple groups of toggle switches corresponding in number to the number of bits involved in the binary identification of a particular drawing and line. These switches are set to agree with the code identifying the desired items. The blocks DI and LI representing drawing identification and line identification involve flip flops of the shift register SR which are set by the drawing address and line address signals on the tape. The outputs of the drawings selection and the drawing identification circuits are applied to a conventional comparator gate CG1. When coincidence exists among the corresponding individual signals from these separate sources the "comparator" gate CG1 is enabled and will gate a clock pulse. Similarly, at such time as line selection and line identification signals are identical, a comparator gate CG2 is partially enabled. The comparator gate CG2 is additionally controlled by the output of the comparator gate CG1. At such time as the line selection and line identification signals are identical and there is an output from the comparator gate CG1, the comparator gate CG2 will gate a clock pulse.

The system may be operated in drawing selection and line selection modes. The line selection mode may not be used without also having a suitable drawing selection quantity, otherwise a line having the identifying code may be selected from any drawing. The application of these circuits in controlling the system is therefore under the control of line select and drawing select switches LSS and DSS, respectively. These switches are used to complete energizing circuits for the coils of respective line and drawing select relays LK3 and DK6, the coils of which in each case are connected between −28 volts and ground by operation of the respective switches. A circuit including a polarizing diode D16 connects the switch LSS to the coil of relay DK6. At such time as switch LSS is closed (the line selection mode) the diode circuit completes an energizing circuit for the coil of relay DK6. Thus, both relays LK3 and DK6 are energized. When relay LK3 is energized, contact LK3a which shunts the line select circuit LS is open and the flip flop FQ2 which is controlled by the output of the comparator gate CG2 may be operated only upon coincidence of the drawing identity and line identity circuit DI and LI with the drawing select and line select circuits DS and LS, respectively. In the drawing select mode the line select circuits LS are not needed. Hence, the relay LK3 is deenergized and contacts LK3a are closed. The output of the comparator gate CG1 is now coupled directly into the flip flop FQ2.

Flip flop FQ2 is the line coincidence and/or drawing coincidence indicator. In its "1" representing electrical state, Q2, this flip flop indicates that coincidence exists. In its "0" representing electrical state, $\overline{Q2}$, the flip flop indicates that drawing coincidence does not exist. This flip flop, when the system is started, is normally set in its $\overline{Q2}$ electrical state to indicate that drawing coincidence does not exist. It is also set to its $\overline{Q2}$ electrical state between each line instruction block.

Control flip flops FQ6, FQ1 and FQ7 which are cascaded in the sequence described are utilized in the production of delayed clock pulses which are used in controlling the flip flops of the shift register and in the production of an end of block signal. As described hereinabove, at the time the system is to be started flip flops 1F2 through 1F24 are switched to their zero representing electrical states, whence, the output of all of these flip flops is the "0" or the $\overline{Q}$ electrical output, that for flip flop 1F24 being designated $1\overline{Q}24$ and shown as input to the flip flop FQ6. The other input terminal of flip flop FQ6 is designated 1Q24 which is the representation of the electrical state of flip flop 1F24 in its "1" representing electrical state. Flip flop 1F1 the first flip flop in this particular flip flop channel of the shift register is set to its "1" representing electrical state, 1Q1.

At the time the system is started the signal $1\overline{Q}24$ exists. This signal remains through 22 clock pulses and on the 23rd clock pulse the "1" which was originally stored in flip flop 1F1 is transferred to the flip flop 1F24. Hence, on the 23rd clock pulse the output of the flip flop 1F24 is represented by 1Q24. With the 24th clock pulse of the bit shift cycle the control flip flop FQ6 contains the "1" that was initially contained in flip flop 1F1. The "1" representing electrical state of flip flop FQ6 and the next clock pulse turn off the flip flop FQ1 so that it switches to its $\overline{Q1}$ electrical state.

As illustrated, a pulse converter and delay circuit PC receives the output from the tape reader TR producing the delayed unidirectional clock pulses CP previously described. These clock pulses are used to produce the delayed clock pulses DCP which are applied as inputs to an "and" gate AG8 having an electrical output designated GCP representing gated clock pulses. "And" gate AG8 is enabled by the presence of the signal Q1 on one of its input terminals. Hence, as long as flip flop FQ1 is in its "1" representing electrical state, in which the signal Q1 exists, the clock pulses GCP are produced. This is the normal state of the flip flop FQ1 during reading of the tape and shifting of the information into the tape reader. The gated clock pulse GCP is the signal applied to the respective "and" gates of the shift register SR and is the clock pulse signal which steps these flip flops in time displaced synchronism with reading of the information from the tape. The clock pulse column of the tape includes several clock pulses beyond the 24 clock pulse limit. Hence, additional clock pulses are provided beyond the end of a block to properly control the flip flop FQ1 and, in turn, the flip flop FQ7 to produce the necessary output signals to stop the tape at the end of the message for a particular line.

Flip flop FQ7 is normally in its zero representing electrical state $\overline{Q7}$. At the end of tape reading (the 26th clock pulse) this flip flop is switched to its "1" representing electrical state, Q7. This signal is selectively utilized with other signals to affect certain controls, as will be described.

Since the output, Q2, of flip flop FQ2 represents drawing or drawing and line coincidence, and since the output, Q7, of the flip flop FQ7 denotes that a block of information has been read, the simultaneous occurrence of these two signals is indicative that the tape should be stopped. These two signals are combined in the input circuits of an "and" gate AG4 producing an output signal when input signal coincidence exists. This signal is applied by an "or" gate OG1 to one of two input terminals of a tape deck flip flop FQtd which sets this flip flop in its zero representing electrical state $\overline{Q}td$. This signal controls a relay driver RD1 to inhibit signal TD and stop the tape. When this signal is removed the output signal TD of the relay driver RD1 starts the tape.

When the system is not in its drawing selection or line selection modes of operation relay DK6 is deenergized. Under these circumstances the contacts DK6b are closed. Since drawing coincidence is not a part of the control under these circumstances, the signal Q7 is utilized by itself when the contacts DK6b are closed to generate the signal $\overline{Q}td$. This is accomplished by applying the electrical signal Q7 through the contacts DK6b to the input of an "or" gate OG1. This signal is therefore separately gated to generate the stop signal at the output of the gate and set the flip flop FQtd to its $\overline{Q}td$ electrical state to stop the tape. When the system is started the flip flop FQ7 is in its $\overline{Q7}$ electrical state. Assuming that this system is not in its drawing selection or line selection mode, closure of the start switch SW results in the application of a signal to one terminal of an "and" gate AG6. The other input terminal of "and" gate AG6 has the signal $\overline{Q}td$ applied thereto by the output of an emitter follower circuit EF1 of conventional type controlled by the output $\overline{Q}td$ of the flip flop FQtd. This flip flop is set in this electrical state after the tape is stopped and remains in this electrical state. The output of the "and" gate AG6 is applied as input to an "or" gate OG2, the output of which triggers a one shot multivibrator MV1. The output of this multivibrator is applied to the one setting input terminal of tape deck flip flop FQtd which switches this flip flop to its one representing electrical state Qtd. With switching of signal $\overline{Q}td$, the forward signal TD to the tape deck is produced and the tape deck begins to operate. The output of the one shot multivibrator MV1 is also applied to a reset generator RG1. The output of this reset generator is applied to the reset terminal of the control flip flops FQ6 and FQ7, to the one setting or the set terminal of flip flop FQ1, to the one setting input terminal of the flip flop 1F1 and to the zero setting or reset terminals of the flip flops 1F2 through 1F24. At this time the shift register flip flops and the control flip flops are in their proper electrical states for tape reading.

Flip flop FQ1, in its "1" representing electrical state in combination with the clock pulses CP produced by the pulse conversion circuit PC, now produces a voltage state signal which is connected to one input terminal of an "and" gate AG8, the other input terminal of which receives the delayed clock pulse DCP. The output of "and" gate AG8 is the gated clock pulse GCP which is coupled to the "and" gates connecting the flip flops of the shift register (see FIG. 4). The information which is being read from the tape is synchronously stepped into the shift register. When flip flop FQ7 goes high, as earlier described, the signal $\overline{Q}td$ is produced and the tape is stopped. In this mode of operation a manual mode switch MMS is opened to inhibit the generation of "reset" and "start" signals whenever the line or "figure complete" relay K20 operates.

In the drawing selection mode of operation relay DK6 is energized, Contacts DK6a are closed and Contacts DK6b are opened. Initially there is an absence of coincidence between electrical outputs of the drawing selection and drawing identification circuits. Flip flop FQ2 is off and the signal $\overline{Q}2$ exists. This signal, along with the signal Q7 from flip flop FQ7 and the gated clock pulse GCP, is applied as input to an "and" gate AG3. If at the end of a complete block of information drawing coincidence does not exist, the signal $\overline{Q}2$ yet remains. Signal Q7, which is high at the end of the particular block which has just been read, is now utilized with signal $\overline{Q}2$ and the gated clock pulse GCP to provide another start signal to reset the shift register and the control flip flops so that another block of tape may be read. At such time as drawing coincidence exists the flip flop FQ2 switches to its Q2 electrical state. At the end of that particular block of information when the flip flop FQ7 goes high, "and" gate AG4 produces an electrical output which is gated by "or" gate OG1 to reset flip flop FQtd, inhibiting signal TD to stop the tape deck.

From time to time drawings must be changed. One great advantage in systems of this type is the fact that the making of drawing changes is facilitated. Inasmuch as each line of the drawing is coded, it is possible to identify a line on a particular drawing at which a change is to be made. The system therefore includes an arrangement which will stop the tape deck and, hence, stop system operation at such time as a particular line which is to be changed occurs. This is accomplished in the following way. A circuit is provided between the output of the comparator gate CG2 which is the line coincidence comparator gate and the input to "and" gate AG5 which supplies the analog start signal to the relay K14 to start the analog system. This circuit includes a modification selection amplifier MSA, which may be a unity gain inverter, which inverts the output of the comparator gate CG2. A modification selection switch MS1 switches a terminal of "and" gate AG5 between ground and the output of the inverter modification selection amplifier MSA. When the modification selection circuit is not in use, switch MS1 is positioned, as shown, to ground the terminal of "and" gate AG5 which applies a gating potential to this terminal. When the modification selection is desired switch MS1 is moved to connect the output of the inverter modification seelction amplifier MSA to the input of the "and" gate. In this mode of operation a drawing selection has been made so throughout the drawing period and prior to the time that the particularly selected line appears on the tape, the system will cycle through the blocks of tape reading and reproducing one line after another. The line selection circuit LS is set to indicate the particular line. If the selected line is line 58 of the drawing the line selection switches are correspondingly set. Up to the time the code for line 58 exists at the line identity circuit LI the output of the comparator gate CG2 is low. This voltage is inverted to gating potential and applied to "and" gate AG5. Hence, with the occurrence of the other signals on "and" gate AG5 this gate is enabled and the analog system is enabled and line reproduction continues as previously described. At the time that line coincidence occurs the output of comparator gate CG2 goes high. This is inverted in the inverter amplifier and as a consequence the "and" gate AG5 is inoperative to generate a further analog start signal S. As a consequence the system stops at this point in the operating cycle. At this point the tape which has been used may be removed and changed or another tape which has been modified substituted therefor so that the drawing may continue with whatever changes are desired. It will be appreciated that expediencies such as this facilitate drawing changes in that the time for effecting such changes is materially reduced.

At such time as a message has been completely read from the tape and stored in the shift register the system is ready to reproduce the stored information on the drawing. For this reason the signals Q2 and Q7 are used jointly to enable the analog portion of this system. After a particular drawing selection has been made and the tape reader has been stopped the switch DSS is open which deenergizes relay DK6. At this time contacts DK6b close connecting the signal Q7 as input to one terminal of the "and" gate AG5. The signal Q2 indicating drawing selection coincidence exists on the other terminal of the "and" gate AG5. Gate AG5 now operates a relay driver circuit RD1 which produces a start signal S used to energize an analog uncaging relay K14. The contacts of relay K14 now connect −28 volts to the analog circuit.

Thus, in accordance with this invention, there has been described a control circuit for an automatic drafting machine that provides a selection mode to select stored information on a tape representative of a desired line and then draws the lines of the drawing. When the desired line and drawing are selected, the machine responds during line and drawing coincidence to draw lines in response to information on the moving tape until the drawing is completed. During the machine operation the system responds to a control register to transfer information into the machine from the tape, to stop the tape when required, and to start the drawing of each line when a drawing or line has been selected. Also, in accordance with this invention, a line modification mode is provided by closing a drawing select switch and a modification mode switch to control the machine to continually draw lines in response to the information on the tape until a selected line is reached and to then stop the drawing operation.

Although but one embodiment of this invention has been described herein it will be appreciated by those skilled in the art that numerous changes may be made in certain organizational aspects hereof and that numerous changes may be made in the details of circuits which are employed herein to achieve the stated results. It is therefore intended that the foregoing disclosure and the showing made in the drawing shall be considered only as illustrative of the principles of this invention and are not to be construed in a limiting sense.

What is claimed is:

1. In a drafting machine, a circuit for selecting drawing and line information on a moving tape, with the information being transferred to a register, comprising: drawing identification means forming part of said register and responsive to drawing identification information on the tape; line identification means forming part of said register and responsive to line identification information on said tape; first and second comparators CG1, CG2 coupled together and coupled respectively to said drawing identification means and to said line identification means; drawing selection means coupled to said first comparator; line selection means coupled to said second comparator; a coincidence flip flop, an "or" gate coupled between said second comparator CG2 and said coincidence flip flop; a line select switch; first relay means having a normally closed switch coupled between said first comparator CG1 and said "or" gate and coupled to said line select switch for being energized thereby to open said normally closed switch for line selection; a diode coupled to said line select switch; second relay means coupled to said diode and having a normally open switch coupled to said coincidence flip flop, a drawing select switch coupled to said second relay means for closing said normally open switch thereof, for drawing selection; reset means coupled between said normally open switch of said second relay means and said register for resetting the register during non-coincidence of the selected and identified line and drawing or of the selected and identified drawing; and tape stopping means coupled to and controlled by said coincidence flip flop for stopping said tape at coincidence of the selected and identified line and drawing or of the selected and identified drawing.

2. A circuit for selecting information on a moving tape and controlling a line drawing system responding to a storage register, comprising: first and second comparator gates coupled in series; drawing identification means forming part of said storage register and responsive to drawing identification signals on said tape and coupled to said first comparator gate; drawing selection means coupled to said first comparator gate for providing selected drawing identification signals; line identification means forming part of said storage register and responsive to line identification signals on said tape and coupled to said second comparator gate; line selection means coupled to said second comparator gate for providing selected line identification signals; a coincidence flip flop; an "or" gate coupled from said second comparator gate to the input of said coincidence flip flop; a first relay having a coil and having a switch coupled between the output of said first comparator gate and said "or" gate; a line selection switch coupled to the coil of said first relay for opening the switch thereof when a line selection is to be made; diode means coupled to said line selection switch; control means coupled to said storage register for providing a signal when the register is filled with information from said tape; a second relay having a coil coupled to said diode means and having first and second switches respectively coupled to a first output terminal of said coincidence flip flop and to said control means, and respectively closed and opened when the coil is energized; a drawing selection switch coupled to the coil of said second relay for selectively energizing said coil of said second relay; an "and" gate coupled to said second switch of said second relay and to said control means; controllable reset means coupled between said third "and" gate and said register for resetting said register when filled in the absence of coincidence, and a fourth "and" gate coupled from said first switch of said second relay and a second output terminal of said coincidence flip flop to the line drawing system, for providing signals for starting the drawing operation.

3. In a drafting machine, a system for selecting a line and stopping the drawing operation thereat, comprising: a movable tape means having groups of binary control information serially arranged therealong for each line to be drawn, each group having a drawing number and a line number; a storage register coupled to said tape means for receiving the binary information; a function generator coupled to said storage register; line control means coupled to said storage register and to said function generator for moving a pen to draw lines; a start relay for energizing said line control means; first and second comparator gates coupled respectively in series; drawing identification means coupled to said storage register and to said first comparator gate; drawing select means coupled to said first comparator gate; line identification means coupled to said storage register and to said second comparator coincidence gate; line select means coupled to said second comparator gate and including means for selecting a stop line number; an "or" gate coupled to said first and second comparator gates; a control flip flop coupled to and controlled by said "or" gate; an end of message register coupled to said storage register for responding when said storage register is filled with control information; a coincidence gate coupled from said control flip flop and said end of message register to said start relay; inverting means coupled between said second comparator gate and said coincidence gate; reset means coupled between said control flip flop and said storage register; and tape stopping means coupled from said control flip flop and said end of message register to said movable tape means for stopping the tape when said storage register contains a group of control information, whereby said start relay is energized during drawing coincidence and said pen draws lines and said start relay is prevented from being energized when a selected line is reached on said tape as determined by the stop line number in said line select means.

4. In a drafting machine having a message register, a pen control system including a line complete relay, a tape stop relay for controlling a tape reader including tape with groups of information for drawing lines, each group including a drawing number and a line number, and a start relay for starting the drawing of each line, comprising: a control register coupled to said message register for developing an end of message signal when said message register is filled; first and second comparator gates respectively coupled together; drawing identification means forming a part of said message register and responsive to signals from said tape and coupled to said first comparator gate; drawing select means coupled to said first comparator gate; line identification means forming a part of said message register and coupled to said second coincidence gate and responsive to signals from said tape; line selection means coupled to said second coincidence gate; an "or" gate coupled to said first and second comparator gates; a flip flop coupled to said "or" gate; a first coincidence gate coupled to said flip flop and to said control register; message, register control means having inputs coupled to said coincidence gate and to said line complete relay and having an output coupled to said message register to selectively reset said message register; a second coincidence gate coupled from said flip flop and said control register to said stop relay for stopping said tape reader when said message register is filled with information; a third coincidence gate coupled from said flip flop and said control register to said start relay; inverting means coupled between said second comparator gate and said third coincidence gate; said third coincidence gate being operative and producing an electrical output for starting said start relay when said register is filled, whereby during drawing coincidence a line number in said line select means provides coincidence so that said second comparator gate is enabled to render said third coincidence gate inoperative.

5. In a drafting machine having a shift register for periodically receiving groups of control information from a moving tape, said groups of control information containing drawing identification and line identification numbers, said machine including a function generator operable in response to a start means and line forming means coupled to the shift register and to the function generator for moving a pen to draw lines, a modification system for drawing lines to a selected line identification number and then stopping, comprising: first and second comparator gates respectively coupled in series; drawing identification means coupled to said first comparator gate and responsive to the drawing identification numbers on said tape; drawing select means coupled to said first comparator gate; line identification means coupled to said second comparator gate and responsive to the line identification numbers on said tape; line select means coupled to said second comparator gate for providing a signal to terminate line drawing; an "or" gate coupled to said first and second comparator gates; a flip flop coupled to said "or" gate; a control register coupled to said shift register for developing an end of message signal; a coincidence gate coupled to said flip flop, to said control means and to said start means; inverting means coupled to said second comparator gate; switching means coupled between said inverting means and said coincidence gate, and clock means coupled to said first and second comparator gates and to said coincidence gate, to said flip flop, to said shift register, and to said control means, whereby when said switching means is closed the system draws lines in response to drawing coincidence and end of message coincidence with the line coincidence signal from said second comparator gate being inverted in said inverter, and when a selected terminating line number as determined by said line select means provides coincidence in said second comparator gate, said coincidence gate is open so that said start means is prevented from starting said function generator.

6. In a drafting system having a shift register for periodically receiving groups of control information from the surface of a moving tape, said groups of control information each representing a line to be drawn and each containing drawing identification and line identification numbers, said system havng line drawing control means responsive to said shift register and a start relay for drawing each line sequentially, a circuit for modification of a drawing by drawing of lines up to a selected line identification number, comprising: first and second serial coupled comparator gates; drawing identification means coupled to said comparator gate and responsive to said drawing identification numbers; drawing select means coupled to said first comparator gate; line identification means coupled to said second comparator gate and responsive to the line identification number on said tape; line select means coupled to said second comparator gate for selecting a line number to terminate the drawing operation; an "or" gate coupled to said first and second comparator gates, a flip flop coupled to said "or" gate; means coupled between said flip flop and said shift register for periodically resetting said shift register; control means coupled to said shift register for developing an end of message signal when said register is filled; means coupled to said flip flop and to said control register for stopping the tape when said register is filled; a coincidence gate coupled to said control means and to said flip flop; inverting means coupled to said second comparator gate and to said start relay; and switching means coupled between said inverting means and said coincidence gate for coupling said inverting means thereto when it is desired to stop drawing at a selected line, whereby when said switching means couples said inverting means to said coincidence gate, the system draws lines until said second comparator gate forms a signal as a result of line coincidence and applies an inverted signal to said coincidence gate for preventing energization of said start relay and stopping the drawing operation.

7. In a drafting machine having a tape reader with a tape including serial arranged groups of control information each group including a drawing identification number and a line identification number, having a shift register for receiving the groups of information from the tape reader and having function generator means coupled between said shift register and a pen control means for drawing a line in response to each group of control information, a system comprising: first and second serially coupled comparator gates; drawing identification means coupled to said first comparator gate and forming a part of said shift register for receiving the drawing identification numbers; drawing select means coupled to said first comparator gate for selecting a desired drawing number; line identification means coupled to said second comparator gate and forming a part of said shift register for receiving the line identification numbers; line select means coupled to said second comparator gate for selecting a line number; and "or" gate coupled to said second comparator gate; a control register coupled to said shift register for developing an end of message signal each time said shift register is filled with a group of control information; first switching means coupled between said first comparator gate and said "or" gate; a flip flop coupled to said "or" gate and having first and second output leads; second switching means having switches coupled to the first output lead of said flip flop and to said control register and coupled to said first switching means for being energized thereby to respectively close and open the switches thereof; a first coincidence gate coupled from the switch at said first output lead of said flip flop and from said control register to said shift register; a second coincidence gate coupled to the second output lead of said flip flop and to said control register; an "or" gate coupled from said switch coupled to said control register and said second coincidence gate to said tape reader for stopping said tape; inverting means coupled to said second comparator gate; third switching means coupled to said inverting means; a third coincidence gate coupled from said third switching means, the switch of said second switching means at said control register and the second output lead of said flip flop to said start relay, for controlling said pen control means to start the drawing of each line in response to drawing and line coincidence and an end of message signal, when said third switching means connects said inverting means to said third coincidence gate, whereby said system draws lines when said second switching means connects said inverting means to said third coincidence gate and said second switching means is energized until the selected line number in said line select means provides line coincidence with the line identification number to open said third coincidence gate and stop the drawing of lines.

References Cited by the Examiner

UNITED STATES PATENTS

| | | | |
|---|---|---|---|
| 2,817,775 | 12/1957 | Rosenberg et al. | 235—151 |
| 2,843,841 | 7/1958 | King et al. | 340—147 |
| 2,866,506 | 12/1958 | Hierath et al. | 346—33 |
| 2,870,429 | 6/1959 | Hales | 340—147 |
| 2,951,230 | 8/1960 | Cadden | 328—37 X |
| 3,007,115 | 10/1961 | Batley | 328—93 X |

MALCOLM A. MORRISON, *Primary Examiner.*

ORIS L. RADER, *Examiner.*

UNITED STATES PATENT OFFICE
CERTIFICATE OF CORRECTION

Patent No. 3,227,864 January 4, 1966

Ronald K. Kadoguchi

It is hereby certified that error appears in the above numbered patent requiring correction and that the said Letters Patent should read as corrected below.

Column 6, line 50, for "1R24" read -- 1F24 --; column 7, line 2, for "an", first occurrence, read -- to --; column 15, line 31, after "said" insert -- first --; column 16, line 15, for "and" read -- an --.

Signed and sealed this 11th day of June 1968.

(SEAL)
Attest:

Edward M. Fletcher, Jr.
Attesting Officer

EDWARD J. BRENNER
Commissioner of Patents